US008805419B2

(12) United States Patent
Marr et al.

(10) Patent No.: US 8,805,419 B2
(45) Date of Patent: Aug. 12, 2014

(54) MANAGEMENT OF ROADSIDE SERVICE REQUESTS

(75) Inventors: Cary Duane Marr, Van Buren, AR (US); Roy B. Sutfin, Van Buren, AR (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 13/356,214

(22) Filed: Jan. 23, 2012

(65) Prior Publication Data

US 2012/0190384 A1 Jul. 26, 2012

Related U.S. Application Data

(60) Provisional application No. 61/436,416, filed on Jan. 26, 2011.

(51) Int. Cl.
*H04W 24/00* (2009.01)

(52) U.S. Cl.
USPC .................................... 455/456.3; 455/404.2

(58) Field of Classification Search
USPC .................... 455/404.1–404.2, 414.1–414.4, 455/456.1–457, 466; 379/45
See application file for complete search history.

(56) References Cited

U.S. PATENT DOCUMENTS

| | | | |
|---|---|---|---|
| 6,694,234 | B2 | 2/2004 | Lockwood et al. |
| 6,714,865 | B2 | 3/2004 | Angwin et al. |
| 6,828,924 | B2 | 12/2004 | Gustavsson et al. |
| 6,980,812 | B1 | 12/2005 | Sandhu et al. |
| 7,050,818 | B2 | 5/2006 | Tendler |
| 7,305,243 | B1 | 12/2007 | Tendler |
| 7,308,273 | B2 | 12/2007 | Zhang |
| 7,706,808 | B1 | 4/2010 | Aggarwal et al. |
| 8,036,160 | B1 * | 10/2011 | Oakes, III ..................... 370/328 |
| 2002/0049535 | A1 | 4/2002 | Rigo et al. |
| 2002/0118796 | A1 * | 8/2002 | Menard et al. .................. 379/45 |
| 2004/0142659 | A1 | 7/2004 | Oesterling |
| 2004/0260470 | A1 | 12/2004 | Rast |
| 2005/0091172 | A1 | 4/2005 | King et al. |

(Continued)

FOREIGN PATENT DOCUMENTS

| | | | |
|---|---|---|---|
| WO | 9914700 | A1 | 3/1999 |
| WO | 9944186 | A1 | 9/1999 |

OTHER PUBLICATIONS

European Search Report for Application No. EP/12152307, Apr. 17, 2012.

(Continued)

*Primary Examiner* — George Eng
*Assistant Examiner* — Marcus Hammonds
(74) *Attorney, Agent, or Firm* — Wood, Herron & Evans, LLP

(57) ABSTRACT

A method and apparatus to manage a service request involves the use of a smart phone's ability to communicate GPS information over the internet. A customer in need of roadside service can submit a roadside service request through a mobile web site or mobile application, and can provide location information through the smart phone's GPS receiver. Should the system not have a location for the customer, a unique URL can be created that identifies the service request and sent for the customer to access on the smart phone, which allows the web server to request the smart phone's GPS location and automatically associate it with the correct service request.

18 Claims, 5 Drawing Sheets

(56) References Cited

U.S. PATENT DOCUMENTS

| | | | | |
|---|---|---|---|---|
| 2005/0151655 | A1 | 7/2005 | Hamrick et al. | |
| 2006/0223494 | A1* | 10/2006 | Chmaytelli et al. | 455/404.2 |
| 2007/0149210 | A1 | 6/2007 | McKiou et al. | |
| 2008/0305763 | A1* | 12/2008 | Wijayanathan et al. | 455/404.2 |
| 2009/0005019 | A1 | 1/2009 | Patel et al. | |
| 2009/0181699 | A1 | 7/2009 | Tysowski | |
| 2009/0233572 | A1 | 9/2009 | Basir | |
| 2009/0313077 | A1 | 12/2009 | Wheeler, IV | |
| 2010/0136954 | A1 | 6/2010 | Bennett, Jr. | |
| 2010/0159894 | A1 | 6/2010 | Rysenga et al. | |
| 2010/0285817 | A1 | 11/2010 | Zhao et al. | |
| 2010/0332133 | A1* | 12/2010 | Harris et al. | 701/211 |
| 2012/0149324 | A1* | 6/2012 | Daly | 455/404.1 |

OTHER PUBLICATIONS

Pinart C et al: "ECall-Compliant Early Crash Notification Service for Portable and Nomadic Devices," 2009 IEEE 69th Vehicular Technology Conference; April 26-29, 2009, Barcelona, Spain, IEEE, Piscataway, NJ, USA, Apr. 26, 2009, pp. 1-5, XP031474465, ISBN: 978-1-4244-2517-4.

3GPP: "No title retrieved," 3GPP Draft; S1-093242, 3rd Generation Partnership Project (3GPP), Mobile Competence Centre; 650, Route Des Lucioles; F-06921 Sophia-Antipolis Cedex; France, no. Roma; 20090810, Aug. 10, 2009, XP050355561, [retrieved on Aug. 10, 2009].

Yunfeng Al et al: "OSGi based integrated service platform for automotive telematics," Vehicular Electronics and Safety, 2007. ICVES. IEEE International Conference on, IEEE, Piscataway, NJ, USA, Dec. 13, 2007, pp. 1-6, XP031233380, ISBN: 978-1-4244-1265-5.

Dukhwan Choi et al: "Telematics Applications Based on TOPAZ Platform," Computer and Information Technology, 2006. CIT '06. The Sixth IEEE International Conference on, IEEE, PI, Sep. 1, 2006, pp. 262-262, XP031021815, ISBN: 978-0-7695-2687-4.

"Green Flag Rescue Me App," http//www.greenflag.com/iphone/rescue-me.html.

"Geico GloveBox," http://www.geico.com/about/mobile-apps/glovebox/.

"Allstate Motor Club Roadside Assistance Mobile App," http://www.roadsidemobile.com/mini/index.do/index.do.

"Mini Roadside Assistance App," http://www.roadsidemobile.com/mini/index.do/index.do.

"AAA Roadside App," http://itunes.apple.com/app/aaa-roadside/id322490679?mt=8.

"OnStar App," http://www.onstarcom/web/portal/mobile.

"Mazda Roadside Assistance App," http://mazda.crosscountry-autocom/.

"MyCadillac App," http://www.cadillac.com/mobileapp/.

"Lexus Enform With Safety Connect," http://secure.drivers.lexus.com/lexusdirvers/magazine/articles/Vehicle-Insider/Lexus-Enform.

"My911 Mobile OnStar Alternative App w/My 911 Services," http://www.my-911.com/My911_Images.html.

"Mercedes-Benz innovates with upgraded mbrace Mobile App for iPhone," http://www.mobiletor.com/2010/09/08/mercedes-benz-inovates-with-upgraded-mbrace-m . . . .

"First BMW emergency roadside assistance mobile app," http://xbmw.blogspot.com/2010/05/first-bmw-emergency-roadside-assstance.html.

"LOCiMobile launches new personal GPS tracking app: 'GPS Tracking'," http://www.locimobile.com/press.cfm?id=34.

"Avis adds roadside assistance to iPhone app," http://news.thewherebusiness.com/content/avis-adds-roadside-assistance-iphone-app.

MobileAppLoader, LLC, "Emergency Road Service," http://itunes.apple.com/sg/app/emergency-road-service/id376916270?mt=8.

Unicor Finance, "Global Road Assistant," http://itunes.apple.com/br/app/global-road-assistant/id406166297?mt=8.

Peterson, Laurie, "AAA Mobile Web and AAA Find Me Available," http://www.aaatravelviews.com/post/2010/05/06/AAA-Mobile-Web-and-AAA-Find-Me-Available, May 6, 2010.

* cited by examiner

MANAGEMENT OF ROADSIDE SERVICE REQUESTS

CROSS-REFERENCE TO RELATED APPLICATIONS

This application claims priority to U.S. Patent Provisional Application Ser. No. 61/436,416 to Cary Duane Marr et al. entitled "MANAGEMENT OF ROADSIDE SERVICE REQUESTS" and filed on Jan. 26, 2011, which application is incorporated by reference herein.

FIELD OF THE INVENTION

The invention is generally related to roadside service, more specifically to initiating, managing, and responding to requests for a roadside service technician.

BACKGROUND OF THE INVENTION

Commercial truck fleets have consistent problems with vehicle maintenance while on the road. Even optimal maintenance between trips cannot eliminate the possibility of mechanical problems when distant from a local repair source. For that reason, national roadside repair services exist and contract with fleets to repair vehicles wherever they break down. In some cases, a repair service is specific to certain features of the vehicle which are relatively straightforward to replace, such as a tire repair service.

Accessing a roadside repair service typically involves calling a number, identifying yourself and your customer information, and accurately reporting your location. The repair service may reference your location against a list of available service professionals, which may be employed directly by the company providing the service or may work independently through a network service agreement as known in the art.

A roadside repair service request as reported by a conventional phone-in process relies heavily on the knowledge of the vehicle operator, who is expected to be able to provide account information and detailed knowledge of his location.

However, in practice, the vehicle operator may not have detailed knowledge of his location. Conveying a vehicle over hundreds or thousands of miles of road, the driver may not be aware of his current city or state, much less the specifics of his truck's position. Finding the location of the vehicle to be serviced may, under certain circumstances, require significant time and effort on the part of the dispatcher handling the call as well as the service technician sent to repair the vehicle. Numerous calls to the customer may be necessary from both service employees, with requiring additional time and frustrating customer.

In addition, the conventional phone-in process may convey only very limited information to the customer—only that information given over the phone by the dispatcher, who may quickly become unavailable on other calls and may be difficult to contact again.

Therefore, a roadside repair service request system is needed that can provide additional information to both the service employees and the customer; that minimizes or eliminates the need for phone contact between the employees and the customer; and that does not rely as heavily on the customer's knowledge of his vehicle's location.

SUMMARY OF THE INVENTION

The invention addresses these and other drawbacks associated with the prior art by providing a system and method to manage a service request for roadside assistance of a vehicle needing service by authorizing a user, receiving data through the internet representing a service request from the user, receiving data through the internet representing a physical location of the vehicle needing service, and associating the location data with the service request data in order to carry out the service request.

In one embodiment, the method further includes receiving data representing a second physical location of a service vehicle dispatched to handle the service request, generating a graphical map where the first and second physical locations are marked on the map, and transmitting the map through the internet to the user.

Consistent with another aspect of the invention, a method for managing a service request includes associating a web address with a service request, sending data to a mobile communications device representing the web address, responding to a device accessing the unique browser address by requesting location data from the device, receiving data through the internet representing a physical location, and associating the location data with the service request data. The web address may be sent to the mobile device as a text message.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The invention is direct to a mobile website that is also available as a mobile app. The system uses the features associated with a smart phone to support a service request.

Rather than using a telephone call between a call center representative and the vehicle operator to fill in information relevant to a service request, the mobile website allows the use of a web-enabled communications device such as an internet-capable mobile phone to gather data automatically.

Modern smart phones often have a number of features that can be used to gather relevant information relating to a service request. By having a customer log into a mobile website, customer information can be automatically associated with the request. Outside of the identity of the customer, the most relevant information, and often the most difficult to accurately determine, is the location of the vehicle to be serviced. The traditional phone request method essentially relies on the customer to determine and accurately relate a vehicle location, which may be insufficient and inaccurate for purposes of the service technician attempting to find the customer's vehicle.

However, many modern web-enabled phones include GPS capability, which may give accurate longitude and latitude coordinates sufficient to find a vehicle—and many web-enabled phones are configured to allow websites and applications to receive and use this location information. Other web-enabled devices without GPS capability include alternative methods of locating the device. The present invention takes advantage of these capabilities of web-enabled devices in order to increase the accuracy and availability of information while putting fewer demands on the customer's time, memory, and knowledge.

Figure 1:
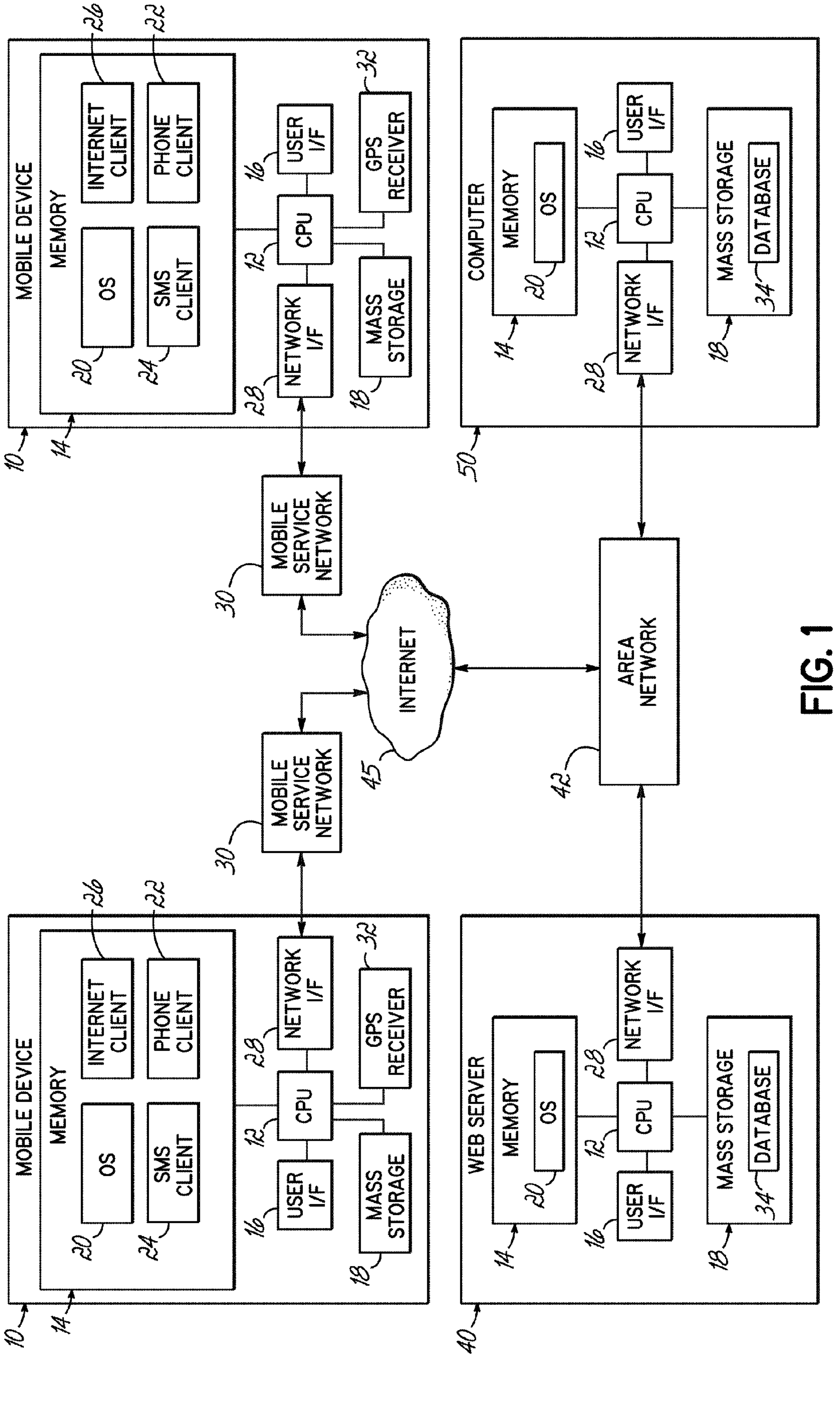
FIG. 1 is a block diagram of exemplary devices which may operate in accordance with the present invention.

As shown in FIG. 1, a vehicle operator may own a web-enabled mobile communications device as illustrated by mobile device 10. The device includes a processing unit 12 in communication with memory 14, a user interface 16, and mass storage 18. The device 10 may include an operating system 20 and programs enabling the device 10 to carry out a variety of communication functions including using a phone network (phone client 22), sending a text message (SMS client 24), and browsing the internet (internet client 26). In one embodiment, each of these functions is carried out through the device's network interface 28, configured to interact with a mobile service network 30 under an agreement with a mobile service provider as known in the art. The mobile device 10 may interface with the mobile service network 30 with any network protocol known in the art—for example, any 2G, EDGE, 3G, LTE, or 4G network protocol may be used. Current mobile devices are often sophisticated and include the ability to use a variety of protocols in order to take advantage of changing conditions. Many mobile communications devices of the sort represented by mobile device 10 of FIG. 1 use a duplex antenna interface between a large base antenna and an antenna embedded within the chassis of the mobile device 10.

Although mobile communication devices are herein described as accessing the internet through a mobile device network, it will be understood that many mobile communication devices also include ways to interact with local area networks through a wireless or wired interface. A mobile communication device may be able to access the internet through either of a mobile service network providing internet access or a local area network providing internet access, depending on the location and situational connectivity of the mobile communication device. In one embodiment, the user accesses an internet client through a mobile browser application and experiences the same mobile internet capabilities and the same websites regardless of how the mobile communication device accesses the internet at any given time.

In response to an event requiring roadside service, the customer uses an internet browser associated with the user's mobile communication device in order to access the roadside service provider's website. This places the internet client 26 in communication with a server 40, which as shown in FIG. 1 may represent a computing system capable of serving web pages in response to client requests over the internet 45. The web server may be capable of detecting that the client is a mobile device and serve a website intentionally optimized for the mobile device. In another embodiment, the mobile website may have a different URL than the standard website, and the user may intentionally access or be directed to the mobile URL and to the mobile website. As illustrated, the web server 40 may be connected to the internet 45 through a local area network 42, upon which is also located a computer 50 operating under the control of a service request dispatcher.

For the purposes of the invention, each computer 40, 50 may represent practically any type of computer, computer system, or other suitable programmable electronic device consistent with the invention. Moreover, each computer 40, 50 may be implemented using one or more networked computers, e.g., in a cluster or other distributed computing system.

Computer 40 typically includes a central processing unit 12 including at least one microprocessor coupled to memory 14, which may represent the random access memory (RAM) devices comprising the main storage of computer 40, as well as any supplemental levels of memory, e.g., cache memories, non-volatile or backup memories (e.g., programmable or flash memories), read-only memories, etc. In addition, memory 14 may be considered to include memory storage physically located elsewhere in computer 40, e.g., any cache memory in a processor in CPU 12, as well as any storage capacity used as a virtual memory, e.g., as stored on a mass storage device 18 or on another computer coupled to computer 40. Computer 40 also typically receives a number of inputs and outputs for communicating information externally. For interface with a user or operator, computer 40 typically includes a user interface 16 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, computer 30 may also include one or more mass storage devices 18, e.g., a floppy or other removable disk drive, a hard disk drive, a direct access storage device (DASD), an optical drive (e.g., a CD drive, a DVD drive, etc.), and/or a tape drive, among others. Furthermore, computer 40 includes an interface 22 with one or more networks (e.g., a LAN, a WAN, a wireless network, and/or the Internet, among others) to permit the communication of information with other computers and electronic devices. It should be appreciated that computer 40 typically includes suitable analog and/or digital interfaces between CPU 12 and each of components 14, 16, 18, 22 as is well known in the art.

In a similar manner to computer 40, computer 50 includes a CPU 12, memory 14, mass storage 18, user interface 16 and network interface 22. However, given the nature of computers 40 and 50 as a web server and a dispatcher's computer system, in many instances computer 40 will be implemented using a multi-user computer such as a server computer, a midrange computer, a mainframe, etc., while computer 50 will be implemented using a desktop or other single-user computer. As a result, the specifications of the CPU's, memories, mass storage, user interfaces and network interfaces will typically vary between computers 40 and 50. Other hardware environments are contemplated within the context of the invention.

The mobile website gives the user the opportunity to log in. Logging in identifies the user as an existing customer, providing the roadside service with information associated with the customer's account.

In one embodiment, a customer that has logged into the mobile website can then initiate a roadside service request through the website. In doing so, the web server creates a service request event within the roadside service system, which can be dealt with as normal by the service system. For example, the service request may alert a dispatcher who is responsible for gathering and confirming the details of the service request and contacting a nearby service technician. In another embodiment, these functions may be carried out by the computer system associated with the service without the intervention of a dispatcher.

In addition to identifying the service request with a customer account, the website may be configured to request additional information from the user. The user may be asked to provide vehicle information, including details relevant to the nature of the malfunction, as well as data associated with the incident that prompted the service request. For example, if the service request is in response to a tire rupture or other tire malfunction, the website could request information regarding the nature of the vehicle and the model, size, and tread of the tires. Alternatively, this information may be received from an account database already associated with the customer, and may be subsequently confirmed by the user through the website.

In one embodiment, a dispatcher may be requested to add to or verify the information associated with the service request by contacting the customer—for example, by calling the customer on his mobile communication device, using the phone client on the device. In another embodiment, the dispatcher may be able to dispatch a service technician without previously contacting the customer.

As shown in FIG. 1, the customer's mobile communication device 10 may include a GPS receiver 32 capable of receiving GPS signals. The mobile communication device 10 may be configured to share this information upon request from a mobile site accessed by the device. Once the customer enters a service request, the mobile site queries the mobile device's GPS location and associates the resulting location with the service request.

In some embodiments, a mobile communication device consistent with the present invention may have means other than a GPS receiver to determine its physical location, and so may not include a GPS receiver 32 as shown in FIG. 1. For example, some mobile service networks can use the locations of multiple base stations to triangulate the position of a mobile communication device, and some mobile communication devices can use ground-base positioning systems in order to determine position. One of ordinary skill will understand that any mechanism by which a mobile communication device may determine its location and subsequently share that location information with a service request system is consistent with the present invention.

Figure 2:
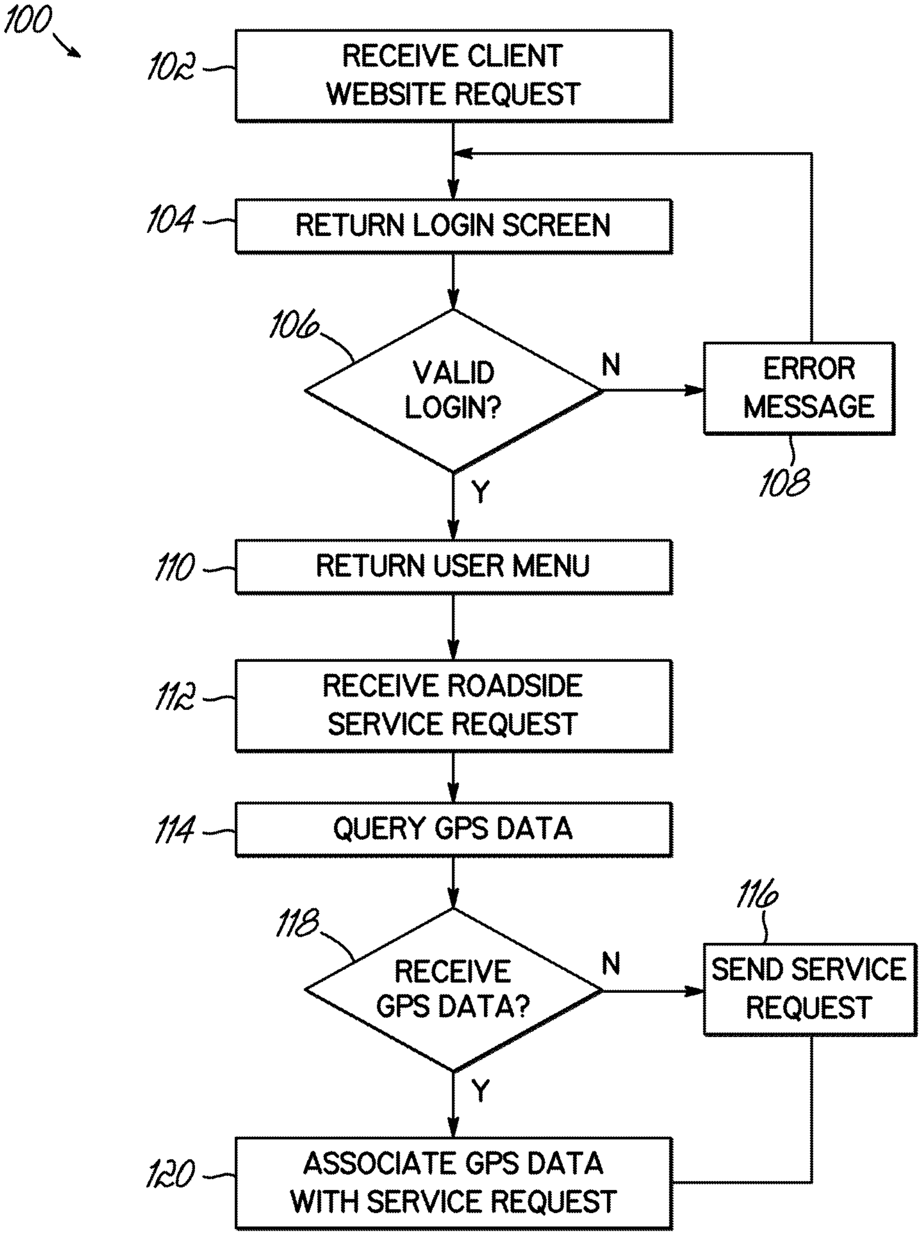
FIG. 2 is a flowchart of a process for serving a mobile website in accordance with the present invention.

FIG. 2 illustrates an example of a web server's process in more detail. In response to a website request from a mobile client (block 102), the server may return a web page associated with a mobile website, which may include a form allowing the user to input login information (block 104). The server then validates a received user name and password (block 106), either delivering an error message and another opportunity to log in (block 108), or permitting the user to access options available to existing customers (block 110). One of these options is to initiate a request for roadside service, which if received (block 112), prompts the user for additional information. The server may then submit a query for GPS data from the mobile device (block 114). Once the website has performed any initial data collection functions via the website interface, it sends the new service request (block 116) associated with a username and any entered information and, if received, GPS data for the customer (blocks 118 and 120).

Figure 3A:
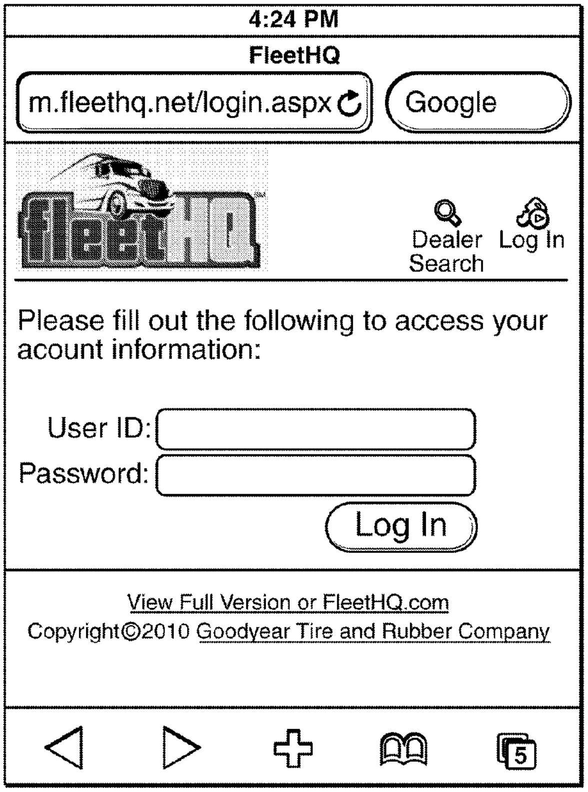
FIGS. 3A through 3C are exemplary mobile web pages associated with a mobile website in accordance with the present invention.
Figure 3B:
Figure 3C:
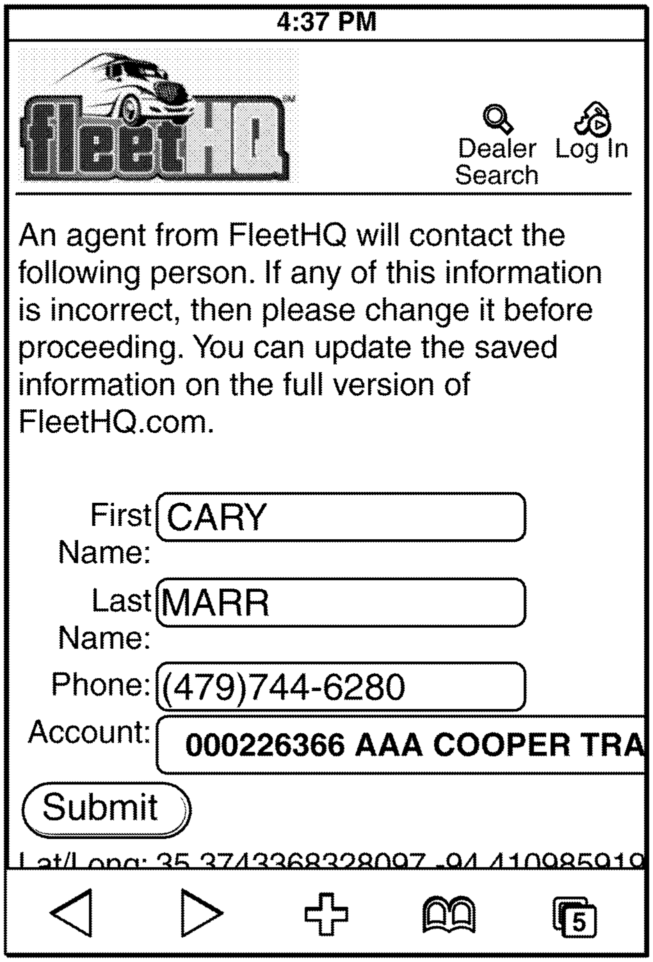

FIG. 3A shows an exemplary login screen in accordance with block 104 of FIG. 2. Text blocks are available for a user name and password, which when entered may be checked against a database accessible to the web server to authenticate the user. FIG. 3B shows an alert from the mobile device indicating that the web server has requested location data. FIG. 3C shows an exemplary form for requesting service.

In some contexts it may be beneficial for the web server to collect GPS information from a customer's smart phone independent of the customer's login and use of the mobile website. For example, where a customer initiates a service request by phone, the customer may not be able to precisely articulate the location of the vehicle to be serviced. Under these circumstances, a method according to one embodiment of the present invention allows the dispatcher to provide a URL for the customer that, when accessed, will provide the user's location to the service request system. Some mobile communications devices are configured to accept text messages and access websites while on the phone, in which case the dispatcher could direct the customer to the sent URL and confirm receipt of the GPS location while the customer is on the phone with the dispatcher. Such a feature may be particularly useful, for example, whenever a customer is not particularly technologically savvy about the data-related functions of his or her mobile device and/or would prefer to talk to a dispatcher rather than submit a service request via a mobile website.

Figure 4:
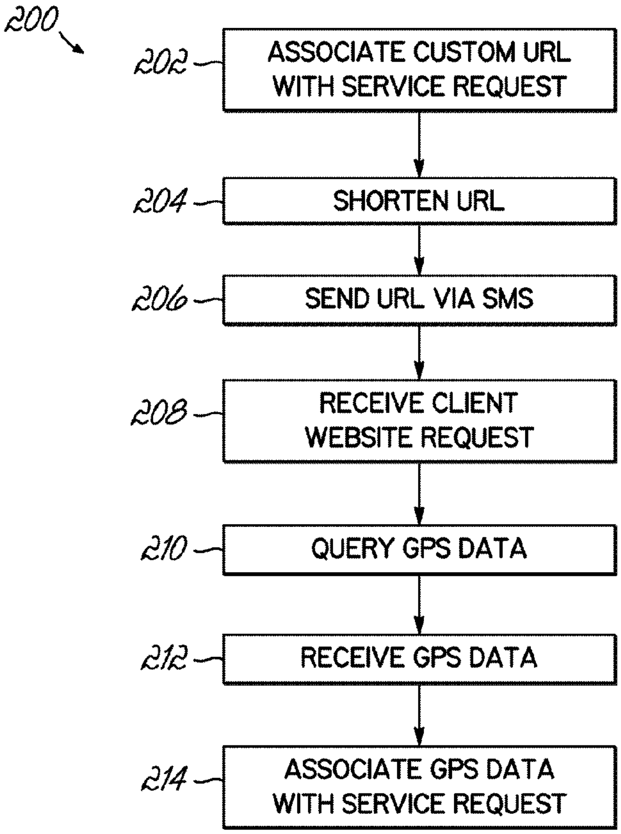
FIG. 4 is a flowchart illustrating a text-to-locate process in accordance with the present invention.

Using a method similar to the flowchart of FIG. 4, a web server in conjunction with a mechanism of creating and sending an SMS or other text message over a mobile service network can send the customer a customized URL to enable a GPS signal to be collected from the device.

As illustrated in FIG. 4, the system may first associate a custom URL with a service request (block 202). The URL may include a domain name which directs to a web server associated with the roadside service system, or alternatively may include an IP address for an associated web server. The address also includes data which allows the system to associate the receipt of the address with a current service request, such as the number of the service request or another number generated for the purpose. Because a URL including uniquely identifying data may be particularly long, the system may also create a shortened URL that is configured to redirect to the longer, custom URL when accessed (block 204). Methods to generate and redirect from a shortened URL are known in the art.

Once the custom URL is generated, it or its shortened form is sent to the customer's mobile communications device through a messaging protocol such as text messaging or instant messaging. On many web-enabled mobile devices, when a URL arrives through a messaging protocol, it is recognized by the messaging client and can be sent to and opened by the internet client immediately. Upon accessing the URL, the web server receives a website request for the unique URL (block 208), which prompts the website to request GPS data from the client device (block 210). As above, the web server is configured to associate received location data (block 212) with the service request already associated with the unique URL (block 214).

Once sufficient information is achieved via the mobile website with, if necessary, additional communication between the customer and the dispatcher, the service request may be carried out by a service technician. Various methods of determining an appropriate technician are known in the art. In one embodiment, the technician may have a mobile communication device 10' which is configured to interface with the service request system. Once contacted, the service technician may be able to access some or all of the information collected regarding the service request, including the location information associated with the request.

In addition to accessing information associated with the service request system, the technician's mobile device 10' may be configured to send information regarding the technician's status. In one embodiment, the technician's status includes the technician's own location, acquired relayed by the mobile communication device's GPS receiver 32. In another embodiment, GPS data may be collected for the roadside service system by a different device, such as the device disclosed in U.S. application Ser. No. 13/356,146 filed on even date herewith by Tristan Sean Putman et al., which is herein incorporated by reference.

When a service technician has been dispatched to the customer's location, the system can generate a map and a time estimate of when the service technician will arrive. Using the GPS information on the customer's phone and the service truck, tied together with the system's service request data, a map with a time estimate will be available to both the customer and the dispatcher.

Figure 5:
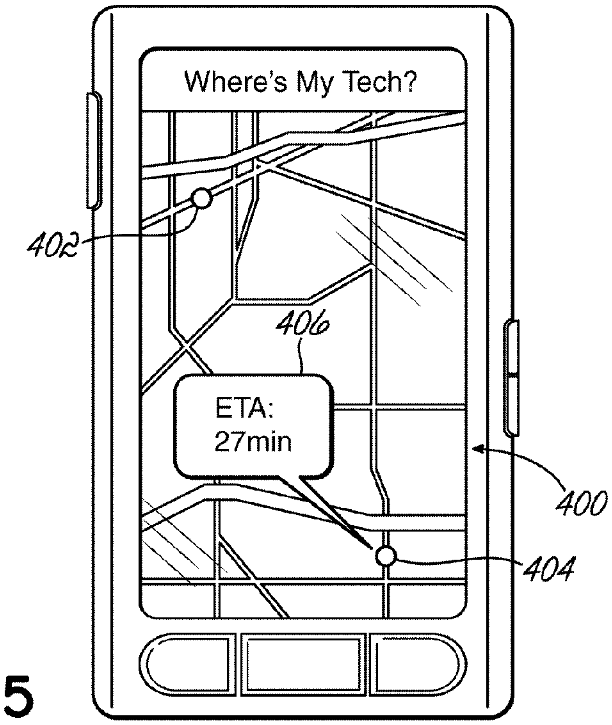
FIG. 5 is an exemplary web page associated with a mobile website in accordance with the present invention.

A map 400 displaying this data is illustrated in FIG. 5. Given two GPS positions, one of ordinary skill in the art will recognize a number of methods known to estimate the time necessary to travel from one to the other. When the service technician's location 402 and the customer's location 404 are both known, they can be placed against a map 400 and an estimate time to arrival 406 can be displayed. Once generated, this map 400 can be sent to the customer via the mobile website or displayed to a dispatcher to use in reporting to the customer.

The map may be re-drawn at a set time interval as known in the art, or the map may be manually refreshed by the user, prompting the map 400 to be redrawn and the time estimate 406 recalculated based on the most recently received GPS data. In one embodiment, a timestamp accompanies location data for the service technician, and a map is only displayed if the timestamp is within a certain defined window to the current time, such that "stale data" is not displayed on the map. Since GPS data may not be as consistently available for the customer and the customer's vehicle will often stay in the same location, the timestamp for the customer's location data may not be evaluated with the same rigor, and "stale data" may be acceptable for the customer's location. In another embodiment, the customer's location is only referenced in drawing the map at less frequent intervals than the service technician's location, or is not referenced at all, and the previously-received location is used.

Although the above embodiments are given with respect to a mobile website accessed through the internet client of a mobile communications device, it will be understood that the features of the mobile website, including the interaction between the customer's device and the roadside service system, can be carried out through a customized application installed and executed on the mobile device.

Other modifications will be apparent to one of ordinary skill in the art, as will other potential applications of the techniques described herein. Therefore, the invention lies in the claims hereinafter appended.

What is claimed is:

1. A method for managing a service request for roadside assistance of a vehicle needing service via an internet connection, comprising:

authorizing a user, receiving service request data through the internet representing the service request from the user, associating a unique URL with the service request, sending data to a mobile communications device representing the unique URL, receiving a web site request for the unique URL from the mobile communication device in response to receiving the website request, requesting location data representing a physical location of the vehicle needing service from the mobile communications device to cause the mobile communications device to generate the location data, wherein the location data is selected from the group consisting of GPS location data, triangulated location data and ground-based positioning system location data, receiving the location data from the mobile communications device through the internet, and associating the location data with the service request data in order to carry out the service request.

2. The method of claim 1, further comprising:

receiving data representing a physical location of a service vehicle dispatched to handle the service request;

generating a graphical map, wherein the physical locations of the vehicle needing service and the service vehicle are marked on the graphical map; and transmitting the graphical map through the internet to the user.

3. The method of claim 1, wherein the location data comprises GPS location data generated by a GPS receiver in the mobile communications device.

4. The method of claim 1, wherein the data representing the unique URL is sent to the mobile communications device as a text message.

5. The method of claim 1, wherein at least one of requesting the location data and receiving the location data is performed while the mobile communications device is engaged in a telephone call with a dispatcher.

6. A method for managing a service request for roadside assistance of a vehicle needing service via an internet connection, comprising:

associating a unique URL with the service request, sending data to a mobile communications device representing the unique URL, receiving a website request for the unique URL from the mobile communication device~ in response to receiving the website request, responding to the mobile communications device accessing the unique URL by requesting location data representing a physical location of the vehicle needing service from the mobile communications device to cause the mobile communications device to generate the location data, wherein the location data is selected from the group consisting of GPS location data, triangulated location data and ground-based positioning system location data, receiving the location data through the internet, and associating the location data with the service request.

7. The method of claim 6, wherein the data representing the unique URL is sent to the mobile communications device as a text message.

8. The method of claim 6, wherein the location data comprises GPS location data generated by a GPS receiver in the mobile communications device.

9. The method of claim 6, wherein at least one of requesting the location data and receiving the location data is performed while the mobile communications device is engaged in a telephone call with a dispatcher.

10. An apparatus, comprising:

at least one processor; and program code configured to be executed by the at least one processor to manage a service request for roadside assistance of a vehicle needing service via an internet connection by:

authorizing a user, receiving service request data through the internet representing the service request from the user, associating a unique URL with the service request, sending data to a mobile communications device representing the unique URL, receiving a website request for the unique URL from the mobile communication device, in response to receiving the website request, requesting location data representing a physical location of the vehicle needing service from the mobile communications device to cause the mobile communications device to generate the location data, wherein the location data is selected from the group consisting of GPS location data, triangulated location data and ground-based positioning system location data, receiving the location data from the mobile communications device through the internet, and associating the location data with the service request data in order to carry out the service request.

11. The apparatus of claim 10, wherein the program code is further configured to:

receive data representing a physical location of a service vehicle dispatched to handle the service request;

generate a graphical map, wherein the physical locations of the vehicle needing service and the service vehicle are marked on the graphical map; and transmit the graphical map through the internet to the user.

12. The apparatus of claim 10, wherein the location data comprises GPS location data generated by a GPS receiver in the mobile communications device.

13. The apparatus of claim 10, wherein the data representing the unique URL is sent to the mobile communications device as a text message.

14. The apparatus of claim 10, wherein at least one of requesting the location data and receiving the location data is performed while the mobile communications device is engaged in a telephone call with a dispatcher.

15. An apparatus, comprising:

at least one processor; and program code configured to be executed by the at least one processor to manage a service request for roadside assistance of a vehicle needing service via an internet connection by:

associating a unique URL with the service request, sending data to a mobile communications device representing the unique URL, receiving a website request for the unique URL from the mobile communication device, in response to receiving the website request, requesting location data representing a physical location of the vehicle needing service from the mobile communications device to cause the mobile communications device to generate the location data, wherein the location data is selected from the group consisting of GPS location data, triangulated location data and ground-based positioning system location data, receiving the location data through the internet, and associating the location data with the service request.

16. The apparatus of claim 15, wherein the data representing the unique URL is sent to the mobile communications device as a text message.

17. The apparatus of claim 15, wherein the location data comprises GPS location data generated by a GPS receiver in the mobile communications device.

18. The apparatus of claim 15, wherein at least one of requesting the location data and receiving the location data is performed while the mobile communications device is engaged in a telephone call with a dispatcher.

* * * * *